2,801,230

POLYISOCYANATE CYCLIC UREA DERIVATIVE REACTION PRODUCTS

George L. Fraser and Robert M. Dickey, Wilbraham, Mass., assignors to Monsanto Chemical Company, St. Louis, Mo., a corporation of Delaware No Drawing. Application September 2, 1953, Serial No. 378,162

25 Claims. (Cl. 260—77.5)

This invention relates to the preparation of resins from cyclic derivatives of urea. More particularly, this invention relates to resinous reaction products of polyisocyanates and cyclic urea derivatives and to the process for preparing such resins.

Polyisocyanates will react with a wide variety of compounds to give products that may be either crystalline or resinous in nature. Thus, resinous reaction products may be prepared by reacting a polyisocyanate with an aliphatic diamine. Generally speaking, however, non-resinous crystalline compounds are formed when polyisocyanates are reacted with urea.

An object of the present invention is the provision of thermosetting resins from polyisocyanates and cyclic urea derivatives.

Another object is the provision of a process for preparing resinous reaction products of polyisocyanates and cyclic derivatives of urea.

These and other objects are attained by reacting a polyisocyanate with an N,N'-ethylene urea.

The following examples are given in illustration and are not intended as limitations on the scope of this invention. Where parts are mentioned, they are parts by weight.

Example I

Prepare a solution by slowly adding 100 parts of N,N'-ethylene urea to 1750 parts of xylene with agitation at room temperature. Add 200 parts of tolylene diisocyanate to the solution. The diisocyanate will dissolve without noticeable reaction. Heat the solution to a temperature of about 50° C. A vigorous reaction occurs and an oily liquid material soon separates from the solution. When the reaction mixture is cooled, the oily material sets to a resinous gummy solid and can be recovered by pouring off the supernatant liquid layer.

The resinous N,N'-ethylene urea-diisocyanate reaction product prepared in this manner is a tacky thermoplastic material that can be used as an adhesive. It may also be blended with surface-coating compositions containing alkyd resins in order to form coating compositions that can be used to form water-resistant films. The product of Example I is converted into an insoluble infusible thermoset resin when heated at temperatures of 100° C. or more in the presence of an additional amount of a polyisocyanate. For this reason, it is particularly useful in the preparation of laminates, as shown by the following example:

Example II

Heat 100 parts of the gummy solid obtained as the reaction product of Example I to a temperature of about 50° C. in order to liquefy the same. Add 20 parts of tolylene diisocyanate with agitation. Coat a wood veneer with this material. Apply an overlayer of another wood veneer and heat the resultant laminate in a suitable press at a temperature of about 130° C. for about 15 minutes at a pressure of about 1000 p. s. i. At the end of this time the resin has been converted into an infusible insoluble thermoset material that firmly bonds the laminae together.

Example III

Prepare a solution by adding 100 parts of bis(hydroxymethyl) N,N'-ethylene urea to 1800 parts of xylene with agitation at room temperature. Add 200 parts of p-phenylene diisocyanate. No appreciable reaction occurs during the addition. Heat the resultant solution to a temperature of about 50° C. in order to initiate reaction and maintain the solution at this temperature until the oily reaction product separates from the solution. When the solution is cooled to room temperature a gummy thermoplastic material is obtained containing unreacted p-phenylene diisocyanate in admixture therewith. This material is recovered by pouring off the supernatant liquid. Heat 100 parts of the resin to about 50° C. in order to liquefy the same and then add 50 parts of wood flour. The resultant composition solidifies when cooled and may be comminuted in order to form a molding powder. Place the shredded composition in a closed mold and heat to a temperature of about 100° C. at a pressure of 1000 p. s. i. for a period of about 15 minutes. At the end of this time a solid, infusible material having the shape of the mold is formed.

The cyclic urea derivatives to be used in accordance with the present invention have the general formula:

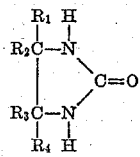

wherein $R_1$, $R_2$, $R_3$, and $R_4$ may be the same or different and are taken from the group consisting of hydrogen and unsubstituted or hydroxy substituted alkyl and aryl radicals containing from 1–14 carbon atoms. Thus, the substituent groups may be methyl, ethyl, butyl, heptyl, octyl, dodecyl, tetradecyl, phenyl, phenethyl, cyclohexyl, hydroxy methyl, hydroxy ethyl, hydroxy butyl, etc. radicals. Mixtures of two or more such cyclic urea derivatives may be used if desired.

The aforementioned cyclic urea derivatives are reacted with polyisocyanates to form the polymeric thermoplastic and thermosetting reaction products of the present invention. Among the polyisocyanates that may be used are the polymethylene diisocyanates such as ethylene diisocyanate, trimethylene diisocyanate, tetramethylene diisocyanate, pentamethylene diisocyanate, etc.; alkylene diisocyanates such as propylene-1,2-diisocyanate, butylene-1,2-diisocyanate, butylene-1,3-diisocyanate, butylene-2,3-diisocyanate, etc.; alkylidene diisocyanates such as ethylidene diisocyanate, butylidene diisocyanate, etc.; cycloalkylene diisocyanates such as cyclopentylene-1,3-diisocyanate, cyclohexylene-1,4-diisocyanate, etc.; cycloalkylidene diisocyanates such as cyclopentylidene diisocyanate, cyclohexylidene diisocyanate, etc.; aromatic diisocyanates such as m-phenylene diisocyanate, p-phenylene diisocyanate, 1-methyl-2,4-phenylene diisocyanate, naphthylene-1,4-diisocyanate, diphenylene-4,4'-diisocyanate, etc.; aliphatic-aromatic diisocyanates such as xylylene-1,4-diisocyanate, xylylene-1,3-diisocyanate, 4,4'-diphenylenemethane diisocyanate, etc.; triisocyanates such as 4,6,4'-diphenyl triisocyanate, 1,2,4-butanetriol triisocyanate, phlorglucinol triisocyanate, 1,3,3-pentane triisocyanate, butane-1,2,2-triisocyanate, etc. Mixtures of two or more such polyisocyanates may be used if desired.

Polymeric materials are prepared in accordance with the present invention by reacting a cyclic urea derivative of the class described with an amount of polyisocyanate sufficient to provide from about 1–4 mols of isocyanate radical per mol of cyclic urea derivative. No particular advantage is obtained by using larger quantities of polyisocyanate.

When a polyisocyanate is added to a cyclic urea derivative of the present invention at room temperature no appreciable reaction will occur. However, if a polyisocyanate is added to the cyclic urea derivative in an amount sufficient to provide one mol or more of isocyanate radical per mol of cyclic urea derivative and the resultant composition is heated to a temperature of from 40–70° C., a reaction will occur and a polymeric thermoplastic material will be formed. It appears that this reaction goes to completion when about 2 mols of isocyanate radical have chemically combined with each mol of cyclic urea derivative and that further reaction will not occur at this temperature even though additional amounts of polyisocyanate are present. As indicated, the product of this reaction is a thermoplastic material. From this it is seen that when a thermoplastic material is to be prepared, the amount of polyisocyanate used should be sufficient to provide a ratio of from about 1–2 mols of isocyanate radical per mol of cyclic urea derivative. The thermoplastic materials are preferably prepared by reacting the cyclic urea derivative with a polyisocyanate in solution in a suitable non-reactive organic solvent in which both materials are soluble. Any suitable non-reactive organic solvent may be used for this purpose, liquid hydrocarbons having a relatively high boiling point such as benzene, toluene, heptane, octane, etc. being preferred. However, other solvents such as dioxane, diethyl carbitol, tetralin, etc. may be used if desired. When a suitable solvent is used, the thermoplastic reaction product separates on completion of the reaction and is easily recovered by pouring off the supernatant layer of solvent. The polyisocyanate and cyclic urea derivative may be reacted in mass if desired although the reaction is more difficult to control and a poorer yield is generally obtained. If the materials are to be reacted in mass, a polyisocyanate that is liquid at reaction temperature is preferred.

When a thermoplastic reaction product of the present invention is heated to a temperature of from about 80–120° C. in the presence of an additional amount of polyisocyanate a second reaction will ensue and the material will lose its thermoplastic properties and be converted to a thermoset material. The change is progressive and is dependent upon the amount of polyisocyanate that is reacted with the thermoplastic material. A transition product that is not completely thermoset is formed when a total of more than about 2 but less than about 2.5 mols of isocyanate radical have chemically combined with each mol of cyclic urea derivative originally used. This reaction product is of utility in the preparation of compositions wherein it is desired to use a relatively hard material having some thermoplastc properties as, for example, in the preparation of surface coatings for exterior use. The initial thermoplastic reaction product is converted to a substantially completely thermoset material when a total of from about 2.5 to 4 mols of isocyanate radical have combined with each mol of cyclic urea derivative originally used.

In preparing the thermosetting materials in accordance with the present invention the entire amount of polyisocyanate that is to be used may be initially added to the cyclic urea derivative or, if desired, the polyisocyanate may be added in separate stages. When the entire amount of polyisocyanate is initially added to the cyclic urea derivative, about 2 mols of isocyanate radical will combine with each mol of cyclic urea derivative at a temperature of from 40–70° C. to form a thermoplastic reaction product in admixture with the unreacted isocyanate. This mixture will be converted to an insoluble infusible thermoset material when heated to a temperature of from 80–120° C. It will be manifest that the cyclic urea derivative may be initially reacted at a temperature of from 40–70° C. with an amount of polyisocyanate sufficient to provide from about 1 to 2 mols of isocyanate radical per mol of derivative in order to form a thermoplastic material and that a further quantity of polyisocyanate may be added to the thermoplastic reaction product, the additional amount of polyisocyanate being sufficient to provide for a total molar ratio of from 2.5 to 4 mols of reacted and unreacted isocyanate radical per mol of cyclic urea derivative originally used. This mixture will likewise harden at a temperature of from 80–120° C. Additional quantities of polyisocyanate can be conveniently added by heating the thermoplastic material to a temperature sufficient to liquefy the same (normally about 50° C.) and then adding the additional polyisocyanate with agitation.

Generally speaking, the thermoplastic materials of the present invention are useful in the preparation of surface coatings, fibers, adhesives, textile treating agents, etc. whereas the thermosetting materials are useful in the preparation of films, molding compounds, etc. Both the thermoplastic and thermosetting materials may be compounded with suitable additives such as fillers, pigments, dyes, natural or synthetic resins such as rosin, alkyd resins, vinyl resins, cellulose derivatives, urea resins, urea-thiourea resins, melamine and other triazine resins, phenolaldehyde resins, drying oils such as linseed oil, etc.

What is claimed is:

1. A polymeric heat reaction product of a cyclic urea derivative having the formula:

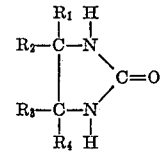

wherein $R_1$, $R_2$, $R_3$ and $R_4$ are taken from the group consisting of hydrogen and unsubstituted and hydroxy-substituted alkyl and aryl radicals containing from 1 to 14 carbon atoms with an amount of a polyisocyanate taken from the group consisting of aromatic, alicyclic and aliphatic polyisocyanates sufficient to provide about 1–4 mols of isocyanate radical per mol of cyclic urea derivative said heat reaction having been carried out at 40–120° C.

2. A polymeric heat reaction product as in claim 1 wherein the cyclic urea derivative is N,N'-ethylene urea and the polyisocyanate is an aromatic polyisocyanate.

3. A polymeric heat reaction product as in claim 2 wherein the aromatic polyisocyanate is tolylene diisocyanate.

4. A polymeric heat reaction product as in claim 2 wherein the aromatic polyisocyanate is p-phenylene diisocyanate.

5. A polymeric heat reaction product as in claim 1 wherein the cyclic urea derivative is bis(hydroxymethyl)-N,N'-ethylene urea and the polyisocyanate is an aromatic polyisocyanate.

6. A polymeric heat reaction product as in claim 5 wherein the aromatic polyisocyanate is tolylene diisocyanate.

7. A polymeric heat reaction product as in claim 5 wherein the aromatic polyisocyanate is p-phenylene diisocyanate.

8. A thermoplastic polymeric heat reaction product of a cyclic urea derivative having the formula:

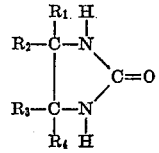

wherein $R_1$, $R_2$, $R_3$ and $R_4$ are taken from the group consisting of hydrogen and unsubstituted and hydroxy-substituted alkyl and aryl radicals containing from 1 to 14 carbon atoms with an amount of a polyisocyanate taken from the group consisting of aromatic, alicyclic and aliphatic polyisocyanate sufficient to provide about 1–2 mols of isocyanate radical per mol of cyclic urea derivative said heat reaction having been carried out at 40–70° C.

9. A thermosetting polymeric heat reaction product of a cyclic urea derivative having the formula:

$$\begin{array}{c} R_1\ H \\ |\ \ | \\ R_2-C-N \\ |\quad\quad\ \ \diagdown \\ \quad\quad\quad\ C=O \\ |\quad\quad\ \ \diagup \\ R_3-C-N \\ |\ \ | \\ R_4\ H \end{array}$$

wherein $R_1$, $R_2$, $R_3$ and $R_4$ are taken from the group consisting of hydrogen and unsubstituted and hydroxy-substituted alkyl and aryl radicals containing from 1 to 14 carbon atoms with an amount of a polyisocyanate taken from the group consisting of aromatic, alicyclic and aliphatic polyisocyanates sufficient to provide in excess of 2 but not more than about 4 mols of isocyanate radical per mole of cyclic urea derivative said heat reaction having been carried out initially at 40–70° C. and completed at 80–120° C.

10. A process for preparing a polymeric resin which comprises reacting a cyclic urea derivative having the formula:

$$\begin{array}{c} R_1\ H \\ |\ \ | \\ R_2-C-N \\ |\quad\quad\ \ \diagdown \\ \quad\quad\quad\ C=O \\ |\quad\quad\ \ \diagup \\ R_3-C-N \\ |\ \ | \\ R_4\ H \end{array}$$

wherein $R_1$, $R_2$, $R_3$ and $R_4$ are taken from the group consisting of hydrogen and unsubstituted and hydroxy-substituted alkyl and aryl radicals containing from 1 to 14 carbon atoms at a temperature of about 40–120° C. with an amount of a polyisocyanate taken from the group consisting of aromatic, alicyclic and aliphatic polyisocyanates sufficient to provide about 1–4 mols of isocyanate radical per mol of cyclic urea derivative.

11. A process as in claim 10 wherein the polyisocyanate and the cyclic urea derivative are reacted in solution in a non-reactive organic solvent.

12. A process for preparing a thermoplastic resin which comprises reacting a cyclic urea derivative having the formula:

$$\begin{array}{c} R_1\ H \\ |\ \ | \\ R_2-C-N \\ |\quad\quad\ \ \diagdown \\ \quad\quad\quad\ C=O \\ |\quad\quad\ \ \diagup \\ R_3-C-N \\ |\ \ | \\ R_4\ H \end{array}$$

wherein $R_1$, $R_2$, $R_3$ and $R_4$ are taken from the group consisting of hydrogen and unsubstituted and hydroxy-substituted alkyl and aryl radicals containing from 1 to 14 carbon atoms in solution in a non-reactive solvent at a temperature of about 40–70° C. with an amount of a polyisocyanate taken from the group consisting of aromatic, alicyclic and aliphatic isocyanates sufficient to provide about 1–2 mols of isocyanate radical per mol of cyclic urea derivative.

13. A process as in claim 12 wherein the polyisocyanate is an aromatic diisocyanate and the cyclic urea derivative is N,N'-ethylene urea.

14. A process as in claim 13 wherein the aromatic diisocyanate is tolylene diisocyanate.

15. A process which comprises the steps of first forming a thermoplastic resin by reacting a cyclic urea derivative having the formula:

$$\begin{array}{c} R_1\ H \\ |\ \ | \\ R_2-C-N \\ |\quad\quad\ \ \diagdown \\ \quad\quad\quad\ C=O \\ |\quad\quad\ \ \diagup \\ R_3-C-N \\ |\ \ | \\ R_4\ H \end{array}$$

wherein $R_1$, $R_2$, $R_3$ and $R_4$ are taken from the group consisting of hydrogen and unsubstituted and hydroxy-substituted alkyl and aryl radicals containing from 1 to 14 carbon atoms in solution in a non-reactive solvent at a temperature of about 40–70° C. with a amount of a polyisocyanate taken from the group consisting of aromatic, alicyclic and aliphatic isocyanates sufficient to provide about 1–2 mols of isocyanate radical per mol of cyclic urea derivative, and then reacting the thermoplactic resin at a temperature of 80–120° C. with an additional amount of said polyisocyanate sufficient to provide up to two additional mols of isocyanate radical per mol of cyclic urea derivative originally employed.

16. A process as in claim 15 wherein the polyisocyanate is an aromatic diisocyanate.

17. A process as in claim 16 wherein the aromatic diisocyanate is tolylene diisocyanate.

18. A process as in claim 16 wherein the aromatic diisocyanate is p-phenylene diisocyanate.

19. A process which comprises the steps of first forming a thermoplastic reaction product by reacting a cyclic urea derivative having the formula:

$$\begin{array}{c} R_1\ H \\ |\ \ | \\ R_2-C-N \\ |\quad\quad\ \ \diagdown \\ \quad\quad\quad\ C=O \\ |\quad\quad\ \ \diagup \\ R_3-C-N \\ |\ \ | \\ R_4\ H \end{array}$$

wherein $R_1$, $R_2$, $R_3$ and $R_4$ are taken from the group consisting of hydrogen and unsubstituted and hydroxy-substituted alkyl and aryl radicals containing from 1 to 14 carbon atoms in solution in a non-reactive organic solvent at a temperature of about 40–70° C. with an amount of a polyisocyanate taken from the group consisting of aromatic, alicyclic and aliphatic polyisocyanates sufficient to provide in excess of 2 but not more than about 4 mols of isocyanate radical per mol of cyclic urea derivative and then forming a thermosetting material by heating the thermoplastic reaction product at a temperature of about 80–120° C.

20. A process as in claim 19 wherein the polyisocyanate is an aromatic diisocyanate.

21. A process as in claim 20 wherein the aromatic diisocyanate is tolylene diisocyanate.

22. A process as in claim 20 wherein the aromatic diisocyanate is p-phenylene diisocyanate.

23. A process as in claim 19 wherein the cyclic urea derivative is N,N'-ethylene urea.

24. A process as in claim 19 wherein the cyclic urea derivative is a hydroxy alkyl N,N'-ethylene urea.

25. A process as in claim 19 wherein the cyclic urea derivative is bis(hydroxymethyl)-N,N'-ethylene urea.

References Cited in the file of this patent

UNITED STATES PATENTS 2,343,808     Schlack _____ Mar. 7, 1944

FOREIGN PATENTS 951,486     France _____ Apr. 18, 1949